(12) United States Patent
Yoo et al.

(10) Patent No.: US 11,050,074 B2
(45) Date of Patent: Jun. 29, 2021

(54) ELASTOMERIC CELL FRAME FOR FUEL CELL AND MANUFACTURING METHOD THEREOF, AND UNIT CELL USING THE SAME

(71) Applicants: Hyundai Motor Company, Seoul (KR); Kia Motors Corporation, Seoul (KR)

(72) Inventors: Jin Hyeok Yoo, Cheonan-Si (KR); Byeong-Heon Jeong, Yongin-Si (KR); Seong Il Heo, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 105 days.

(21) Appl. No.: 16/548,614

(22) Filed: Aug. 22, 2019

(65) Prior Publication Data

US 2020/0185747 A1 Jun. 11, 2020

(30) Foreign Application Priority Data

Dec. 10, 2018 (KR) .................. 10-2018-0158663

(51) Int. Cl.
*H01M 8/1004* (2016.01)
*H01M 8/242* (2016.01)
*H01M 8/1018* (2016.01)

(52) U.S. Cl.
CPC ....... *H01M 8/1004* (2013.01); *H01M 8/1018* (2013.01); *H01M 8/242* (2013.01)

(58) Field of Classification Search
CPC ... H01M 8/1004; H01M 8/1018; H01M 8/242
See application file for complete search history.

(56) References Cited

FOREIGN PATENT DOCUMENTS

| EP | 2942830 | * | 10/2016 |
| JP | 2015-113984 A | | 6/2015 |
| JP | 2016-054229 A | | 4/2016 |
| JP | 2017-212126 A | | 11/2017 |
| KR | 10-2018-0011716 A | | 2/2018 |

* cited by examiner

*Primary Examiner* — Olatunji A Godo
(74) *Attorney, Agent, or Firm* — Morgan, Lewis & Bockius LLP

(57) ABSTRACT

An elastomeric cell frame for a fuel cell in which a membrane electrode assembly and gas diffusion layers are formed using a pair of sheet-type elastomeric frames without a specific adhesive member and in which channels for the flow of reaction gas and coolant are formed, may include an insert formed by bonding a pair of gas diffusion layers to both sides of a membrane electrode assembly and an elastomeric frame.

18 Claims, 9 Drawing Sheets

ELASTOMERIC CELL FRAME FOR FUEL CELL AND MANUFACTURING METHOD THEREOF, AND UNIT CELL USING THE SAME

CROSS-REFERENCE TO RELATED APPLICATION

The present application claims priority to Korean Patent Application No. 10-2018-0158663, filed on Dec. 10, 2018, the entire contents of which is incorporated herein for all purposes by this reference.

BACKGROUND OF THE INVENTION

Field of the Invention

The present invention relates to an elastomeric cell frame for a fuel cell, a method of manufacturing the elastomeric cell frame, and a unit cell using the elastomeric cell frame. In particular, the present invention relates to an elastomeric cell frame for a fuel cell, the elastomeric cell frame integrally bonded to a membrane-electrode assembly and a gas diffusion layer without a specific adhesive member using a pair of sheet-type elastomeric frames, and having channels for the flow of reaction gas and coolant, a method of manufacturing the elastomeric cell frame, and a unit cell using the elastomeric cell frame.

Description of Related Art

A fuel cell, which is a kind of power generation device that converts the chemical energy of fuel into electrical energy through an electrochemical reaction in a stack, not only supplies power for industrial use, home use, and vehicles, but can also be used to supply power for small electronic products such as portable devices, and the applicable fields for the present high-efficiency clean energy source have recently broadened.

A Membrane-Electrode Assembly (MEA) is disposed at the innermost portion of unit cells of common fuel cells. Such an MEA is composed of a polymer electrolyte membrane, which can move hydrogen protons, and catalytic layers applied to both sides of the polymer electrolyte membrane to enable reaction of hydrogen and oxygen, that is, a cathode and an anode.

Furthermore, a pair of bipolar plates that supplies reaction gas and discharges product water produced by a reaction is disposed on a first side and a second side of the MEA, that is, the external sides where the cathode and the anode are disposed. A Gas Diffusion Layer (GDL) that diffuses the reaction gas and the product water or smooths the flow thereof may be disposed between the MEA and the bipolar plates.

A Membrane-Electrode-Gasket Assembly (MEGA) in which an MEA and a gasket are integrated has been used in the related art to keep unit cells hermetic and improve convenience in a stacking process.

Furthermore, recently, an integrated frame in which a gasket and an insert formed by bonding a GDL to an MEA are integrated has been provided.

However, in the integrated frames of the related art, a plastic frame and an insert are bonded using an adhesive member. Furthermore, to manufacture unit cells using the integrated frames of the related art, there is a demand for separate adhesive member and sealing member for bonding bipolar plates and the integrated frames. These processes increase material costs and manufacturing costs.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an elastomeric cell frame for a fuel cell in which a membrane electrode assembly and gas diffusion layers are integrally bonded using a pair of sheet-type elastomeric frames without a specific adhesive, a method of manufacturing the elastomeric cell frame, and a unit cell using the elastomeric cell frame.

Furthermore, various aspects of the present invention provide an elastomeric cell frame for a fuel cell in which channels for the flow of reaction gas and coolant are formed, a method of manufacturing the elastomeric cell frame, and a unit cell using the elastomeric cell frame.

In view of the above aspect, an elastomeric cell frame for a fuel cell may be a cell frame forming a unit cell of a fuel cell and may include: an insert formed by bonding a pair of gas diffusion layers to both sides of a membrane electrode assembly disposed between the gas diffusion layers; and an elastomeric frame in which a pair of sheet-type elastomeric frames is disposed on a bottom portion and a top portion of an edge portion of the insert and is integrated by thermal bonding outside the insert, a reaction surface through-hole in which the insert is disposed is formed, a plurality of intake manifold through-holes for receiving reaction gas and coolant is formed outside the reaction surface through-hole, a plurality of exhaust manifold through-holes for discharging the reaction gas and the coolant is formed at the opposite side, intake land protrusions including at least a first channel for a flow of the reaction gas and the coolant are formed in an area between the reaction surface through-hole and at least any one or more of the intake manifold through-holes, and exhaust land protrusions including at least a second channel for a flow of the reaction gas and the coolant are formed in an area between the reaction surface through-hole and at least any one or more of the exhaust manifold through-holes.

The elastomeric frame may include: a first elastomeric frame which is disposed outside the insert and surrounding the bottom portion and sides of the edge portion of the insert and in which stepped portions surrounding the bottom portion and the sides of the insert are formed in an internal surface of the reaction surface through-hole, and seating grooves communicating with the stepped portions are formed outside at least any one or more of the intake manifold through-holes and outside at least any one or more of the exhaust manifold through-holes; and a second elastomeric frame which is disposed to surround the top portion of the edge portion of the insert and has extensions formed in a shape corresponding to the seating grooves to face the seating grooves and an internal surfaces of the stepped portions of the first elastomeric frame around the edge portion of the insert.

A first bonding portion, in which the stepped portions of the first elastomeric frame and the bottom portion of the insert are thermally bonded to face each other, a second bonding portion, in which the second elastomeric frame, the top portion of the insert, and the seating grooves are thermally bonded to face one another, and a third bonding portion, in which the stepped portions of the first elastomeric frame and the sides of the insert are thermally bonded to face each other may be formed between the insert and the first and second elastomeric frames.

The first elastomeric frame and the second elastomeric frame may have inclined surfaces that have areas facing and corresponding to each other.

The first elastomeric frame and the second elastomeric frame may have prominence-depression structures that have areas facing and corresponding to each other.

The pair of sheet-type elastomeric frames forming the elastomeric frame may include thermoplastic elastomer.

The intake land protrusions and the exhaust land protrusions may be gradually decreased in width in a protrusion direction thereof.

In view of another aspect, a method of manufacturing an elastomeric cell frame for a fuel cell, in which the elastomeric cell frame forms a unit cell of a fuel cell stack, may include: an insert preparation step of preparing an insert by bonding each of gas diffusion layers to both sides of a membrane electrode assembly disposed between the gas diffusion layers; an elastomeric frame preparation step of preparing a pair of sheet-type elastomeric frames each having intake land protrusions and exhaust land protrusions that form channels for the flow of reaction gas and coolant; an arrangement step of arranging the pair of elastomeric frames with the insert therebetween; and a bonding step of integrating the pair of elastomeric frames by thermally bonding the pair of elastomeric frames by heating and pressing the pair of elastomeric frames.

The elastomeric frames may be prepared by forming thermoplastic elastomer in a sheet-type in the elastomeric frame preparation step.

The pair of elastomeric frames may be bonded by heating and pressing a portion or the entirety of areas facing each other of the pair of elastomeric frames with the insert disposed between the pair of elastomeric frames in the bonding step.

The heat which is applied to the pair of elastomeric frames in the bonding step may be higher than the melting temperature of the elastomeric frames.

The pair of elastomeric frames may be thermally bonded to each other without a specific adhesive in the bonding step.

In view of another aspect, a unit cell for a fuel cell may include: an insert formed of a pair of gas diffusion layers each bonded to a first side and a second side of a membrane electrode assembly disposed between the gas diffusion layers; an elastomeric cell frame including an elastomeric frame in which a pair of sheet-type elastomeric frames is disposed on the bottom and the top portion of the edge portion of the insert and is integrated by thermal bonding outside the insert, a reaction surface through-hole in which the insert is disposed is formed, a plurality of intake manifold through-holes for receiving reaction gas and coolant is formed outside the reaction surface through-hole, a plurality of exhaust manifold through-holes for discharging the reaction gas and the coolant is formed at the opposite side, intake land protrusions including at least a first channel for a flow of the reaction gas and the coolant are formed in an area between the reaction surface through-hole and at least any one or more of the intake manifold through-holes, and exhaust land protrusions including at least a second channel for a flow of the reaction gas and the coolant are formed in an area between the reaction surface through-hole and at least any one or more of the exhaust manifold through-holes; and a pair of bipolar plates disposed on both sides of the elastomeric cell frame to guide reaction gas and coolant.

The elastomeric cell frame and the bipolar plates may be bonded by thermally bonding the elastomeric cell frame.

Channels for the flow of the reaction gas and the coolant may be formed by contact of the intake and exhaust land protrusions and the bipolar plate.

Recessions corresponding to the shapes of end portions of the intake land protrusions and the exhaust land protrusions may be formed on the bipolar plates in areas being in contact with the intake land protrusions and the exhaust land protrusions of the elastomeric cell frame.

Guide protrusions surrounding the areas being in contact with the intake land protrusions and the exhaust land protrusions of the elastomeric cell frame may be formed on the bipolar plates.

According to an exemplary embodiment of the present invention, there are the following effects.

First, there is no demand for a specific adhesive for bonding with an interface of bipolar plates or an insert, so it is possible to reduce manufacturing costs by decreasing material costs and removing a process of applying an adhesive, etc.

Second, it is possible to keep a reaction area hermetic without a specific sealing member, and as there is no sealing member, it is possible to reduce manufacturing costs by decreasing material costs and removing a process of forming sealing members.

Third, since it is possible to prevent water produced in a reaction area from diffusing outside the cell through an electrolyte membrane, it is possible to prevent an electrical short between cells and to prevent the corrosion of a fuel cell stack due to leakage of water.

Fourth, since there is no demand for an electrolyte membrane that was used in areas except for a reaction area, material costs may be reduced.

Fifth, it is advantageous in terms of reducing cell pitches, as compared with existing plastic frames, and a compact stack may be achieved because the volume is decreased.

Sixth, a weight reduction may be expected compared with the case of using adhesive members and sealing members in existing plastic frames.

Seventh, an integration process is reduced when stacking fuel cell stacks, so that the manufacturing line may be simplified and the productivity of stacks (ability of stacking cells) may be improved.

Eighth, the components of a unit cell are put into a mold and then integrated by thermal bonding, so bonding precision with an insert may be improved, whereby reduction of a defective fraction and improved mass productivity may be expected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
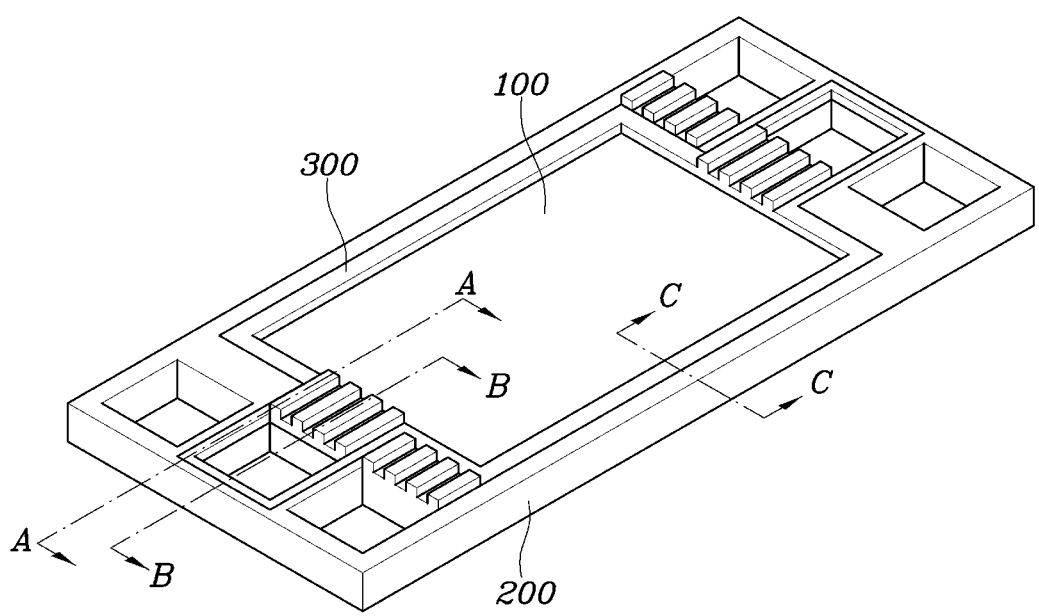
FIG. 1 is an exploded perspective view of an elastomeric cell frame for a fuel cell according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention are described in detail with reference to the accompanying drawings. However, the present invention is not limited to the following embodiments and may be implemented in various ways different from one another, and the exemplary embodiments are provided to complete the present invention and to completely inform those skilled in art of the scope of the present invention. The same components are provided the same reference number in the drawings.

Figure 2:
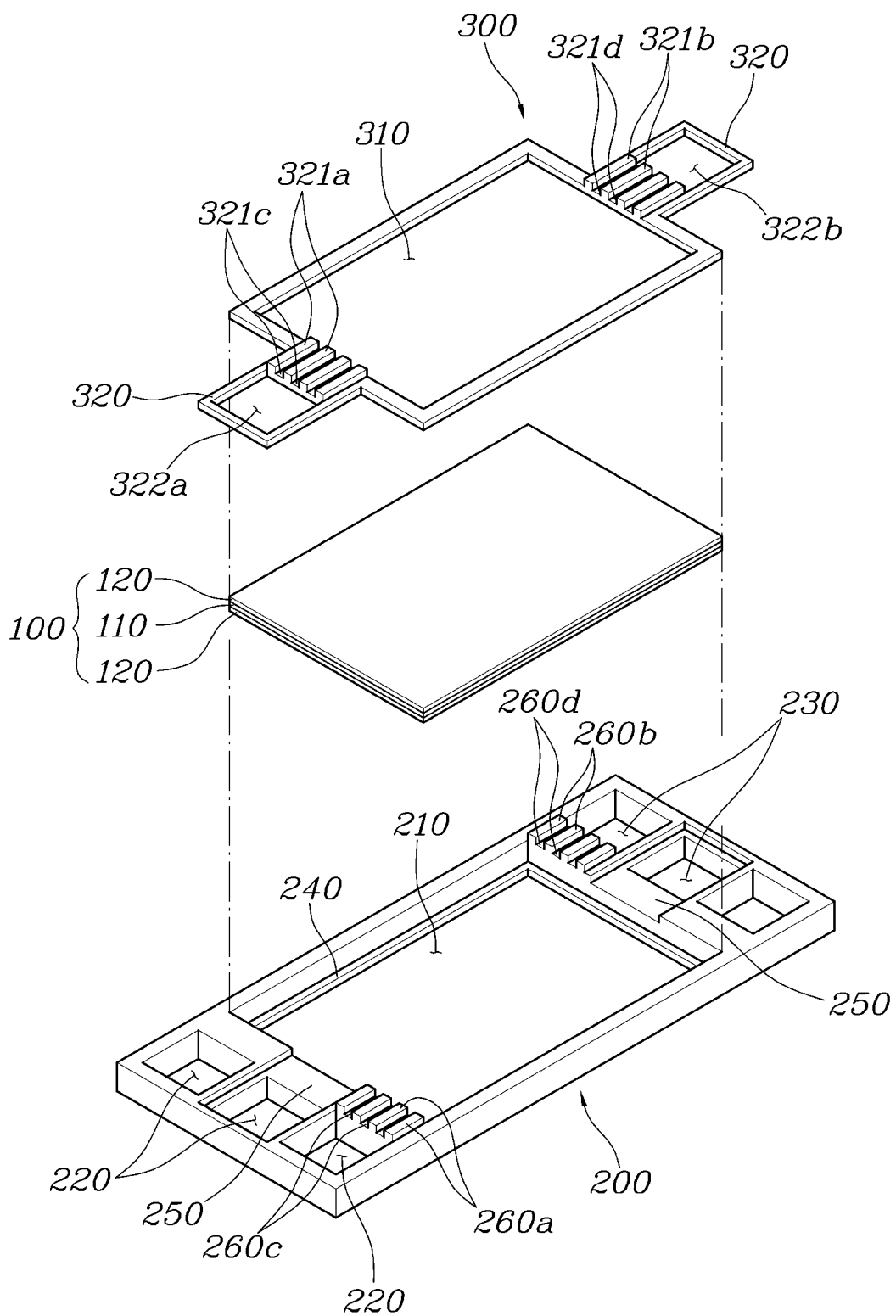
FIG. 2 is an exploded perspective view of the elastomeric cell frame for a fuel cell according to an exemplary embodiment of the present invention.
Figure 3A:
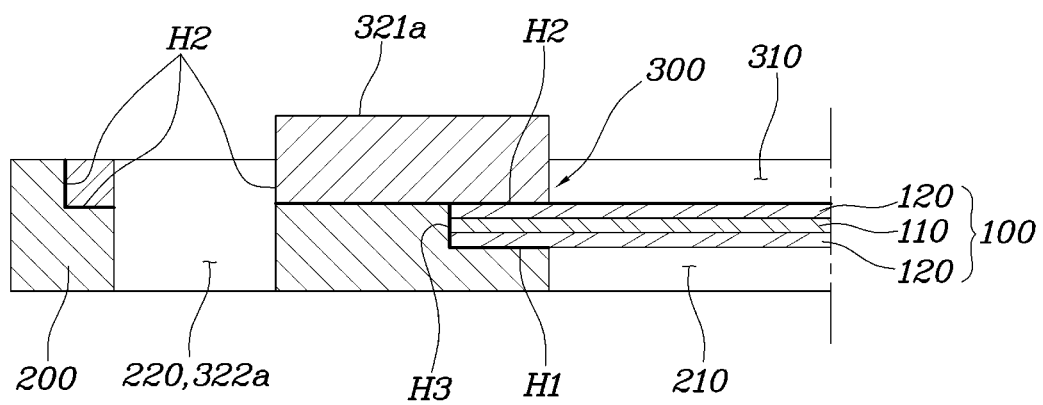
FIG. 3A and FIG. 3B are main-part cross-sectional views of the elastomeric cell frame for a fuel cell according to an exemplary embodiment of the present invention.
Figure 3B:
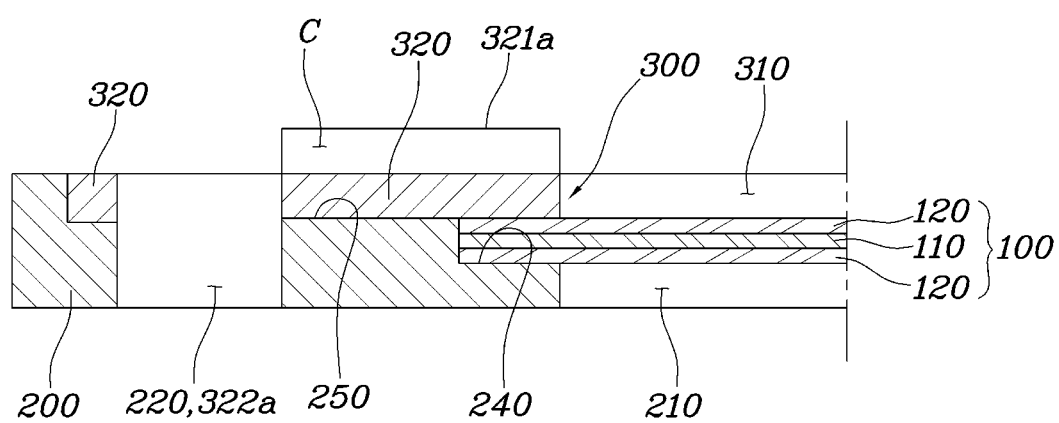

FIG. 1 is an exploded perspective view of an elastomeric cell frame for a fuel cell according to an exemplary embodiment of the present invention, FIG. 2 is an exploded perspective view of the elastomeric cell frame for a fuel cell according to an exemplary embodiment of the present invention, and FIG. 3A and FIG. 3B are main-part cross-sectional views showing the elastomeric cell frame for a fuel cell according to an exemplary embodiment of the present invention. FIG. 3A is a cross-sectional view taken along line A-A of FIG. 1 and FIG. 3B is a cross-sectional view taken along line B-B of FIG. 1.

As shown in the figures, an elastomeric cell frame for a fuel cell according to an exemplary embodiment of the present invention, which is an element forming a unit cell of a fuel cell together with a pair of bipolar plates, includes: an insert 100 including a membrane electrode assembly 110 and a pair of gas diffusion layers 120 bonded to both sides of the membrane electrode assembly 110; and elastomeric frames 200 and 300 integrally formed outside the insert 100 by thermal bonding and forming channels for the flow of reaction gas and coolant by coming in contact with the bipolar plates 10.

Here, the thermal bonding may be any one of hot-press bonding, ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

The insert 100 is a bonded assembly in which the membrane electrode assembly 110 and the pair of gas diffusion layers 120 are stacked. The gas diffusion layers 120 are disposed on a first side and a second side of the membrane electrode assembly 110, respectively.

The membrane electrode assembly 110 is a common membrane electrode assembly 110 including a polymer electrolyte membrane that can move hydrogen protons, and catalytic layers applied to both sides of the polymer electrolyte membrane to enable reaction of hydrogen and oxygen, that is, a cathode and an anode.

The gas diffusion layers 120, which are members that pass and diffuse reaction gas flowing through the bipolar plates in the membrane electrode assembly 110, are each composed of a base material only or, a base material and a Micro-Porous Layer (MPL) formed on a side of the base material. The materials of the base material and the MPL are materials that are applied to common gas diffusion layers.

The elastomeric frames 200 and 300 are integrally formed outside the insert 100 to keep the insert 100 hermetic and improve convenience in a stacking process. The elastomeric frames 200 and 300 are made of Thermoplastic Elastomer (TPE) to maintain predetermined shapes and to be bonded by thermal bonding without a specific adhesive member.

The elastomeric frames 200 and 300 have reaction surface through-holes 210 and 310, respectively, in which the insert 100 is disposed, a plurality of intake manifold through-holes 220 and 322a through which reaction gas and coolant flow inside is formed outside the reaction surface through-holes 210 and 310, respectively, and a plurality of exhaust manifold-through-holes 230 and 322b for discharging reaction gas and coolant is formed at the other side thereof. Intake land protrusions 260a and 321a that form channels 260c and 321c for the flow of reaction gas and coolant are formed in an area between at least one or more of the intake manifold through-holes 220 and 322a and the reaction surface through-holes 210 and 310, and exhaust land protrusions 260b and 321b that form channels 260d and 321d for reaction gas and coolant are formed in an area between at least one or more of the exhaust manifold-through-holes 230 and 322b and the reaction surface through-holes 210 and 310.

In detail, the elastomeric frames 200 and 300 are integrally formed by thermally bonding a pair of sheet-type elastomeric frames 200 and 300 disposed respectively on the bottom and the top portion of the edge portion of the insert 100 outside the insert 100. The 'outside' of the insert 100 means an area including the edge portion of the insert 100 and the space around the edge portion and the 'edge' of the insert 100 means the edge portion area of the insert 100.

For example, as shown in FIG. 2, the elastomeric frames 200 and 300 include a first elastomeric frame 200 disposed and surrounding the bottom portion and sides of the edge portion of the insert 100 and a second elastomeric frame 300 disposed to surround the top portion of the edge portion of the insert 100. The first elastomeric frame 200 and the second elastomeric frame 300 overlap each other at the edge portion of the insert 100.

In detail, the first elastomeric frame 200 is disposed and surrounding the bottom portion and sides of the edge portion of the insert 100 outside the insert 100, a first reaction surface through-hole 210 in which the insert 100 is disposed is formed at the first elastomeric frame 200, and stepped portions 240 surrounding the bottom portion and sides of the insert 100 are formed on the internal surfaces of the first reaction-through hole 210. Seating grooves 250 that communicate with the stepped portions 240 are formed outside at least one or more of the first intake manifold through-holes 220 and outside at least one or more of the second exhaust manifold through-holes 230. For example, as shown in FIG. 2, the seating grooves 250 may be formed outside a first intake manifold through-hole 220 and a first exhaust manifold through-hole 230 formed for the flow of coolant at centers of three first intake manifold through-holes 220 formed in a line on a side of the first elastomeric frame 200 and three first exhaust manifold through-holes 230 formed in a line on the other side of the first elastomeric frame 200.

A first intake land protrusion 260a forming a channel for the flow of reaction gas is formed in an area between the first reaction surface through-hole 210 and the first intake manifold through-hole 220 for the flow of reaction gas of the three first intake manifold through-holes 220 formed at the first elastomeric frame 200, and a first exhaust land protrusion 260b forming a channel for the flow of reaction gas is formed in an area between the first reaction surface through-hole 210 and the first exhaust manifold through-hole 230 for the flow of reaction gas of the three first exhaust manifold through-holes 230 formed at the first elastomeric frame 200.

The second elastomeric frame 300 is disposed to surround the top portion of the edge portion of the insert 100, a second reaction surface through-hole 310 in which the insert 100 is disposed is formed at the second elastomeric frame 300, and extensions 320 having shapes corresponding to the shapes of the seating grooves 250 formed at the first elastomeric frame 200 are formed at the second elastomeric frame 300 to face an internal surfaces of the stepped portions 240 and the seating grooves 250 formed at the first elastomeric frame 200, around the edge portion of the insert 100.

A second intake manifold through-hole 322a and a second exhaust manifold through-hole 322b are formed at the extensions 320 of the second elastomeric frame 300 in shapes and at positions corresponding to the first intake manifold through-hole 220 and the first exhaust manifold through-hole 230 formed at the first elastomeric frame 200. The number of second intake manifold through-hole 322a and second exhaust manifold through-hole 322b corresponds to the number of first intake manifold through-hole 220 and first exhaust manifold through-hole 230 formed in the areas where the extensions are formed.

Second intake land protrusions 321a forming channels for the flow of reaction gas are formed in an area between the second reaction surface through-hole 310 and the second intake manifold through-hole 322a of the extensions 320 of the second elastomeric frame 300, and second exhaust land protrusions 321b forming a channels for the flow of reaction gas are formed in an area between the second reaction surface through-hole 310 and the second exhaust manifold through-hole 322b of the extensions 320 of the second elastomeric frame 300.

Bonding portions are formed by thermal bonding on interfaces facing one another among the insert 100, the first elastomeric frame 200, and the second elastomeric frame 300, so they are securely bonded and integrated.

In detail, as shown in FIG. 3A, a first bonding portion H1 is formed by thermally bonding the stepped portion 240 of the first elastomeric frame 200 and the bottom portion of the insert 100 that face each other, a second bonding portion H2 is formed by thermally bonding the second elastomeric frame 300, the top portion of the insert 100, and the seating grooves 250 that face each other, and a third bonding portion H3 is formed by thermally bonding the stepped portions 240 of the first elastomeric frame 200 and the sides of the insert 100 that face each other.

The shapes of the elastomeric frames of the present invention may be changed.

Figure 4:
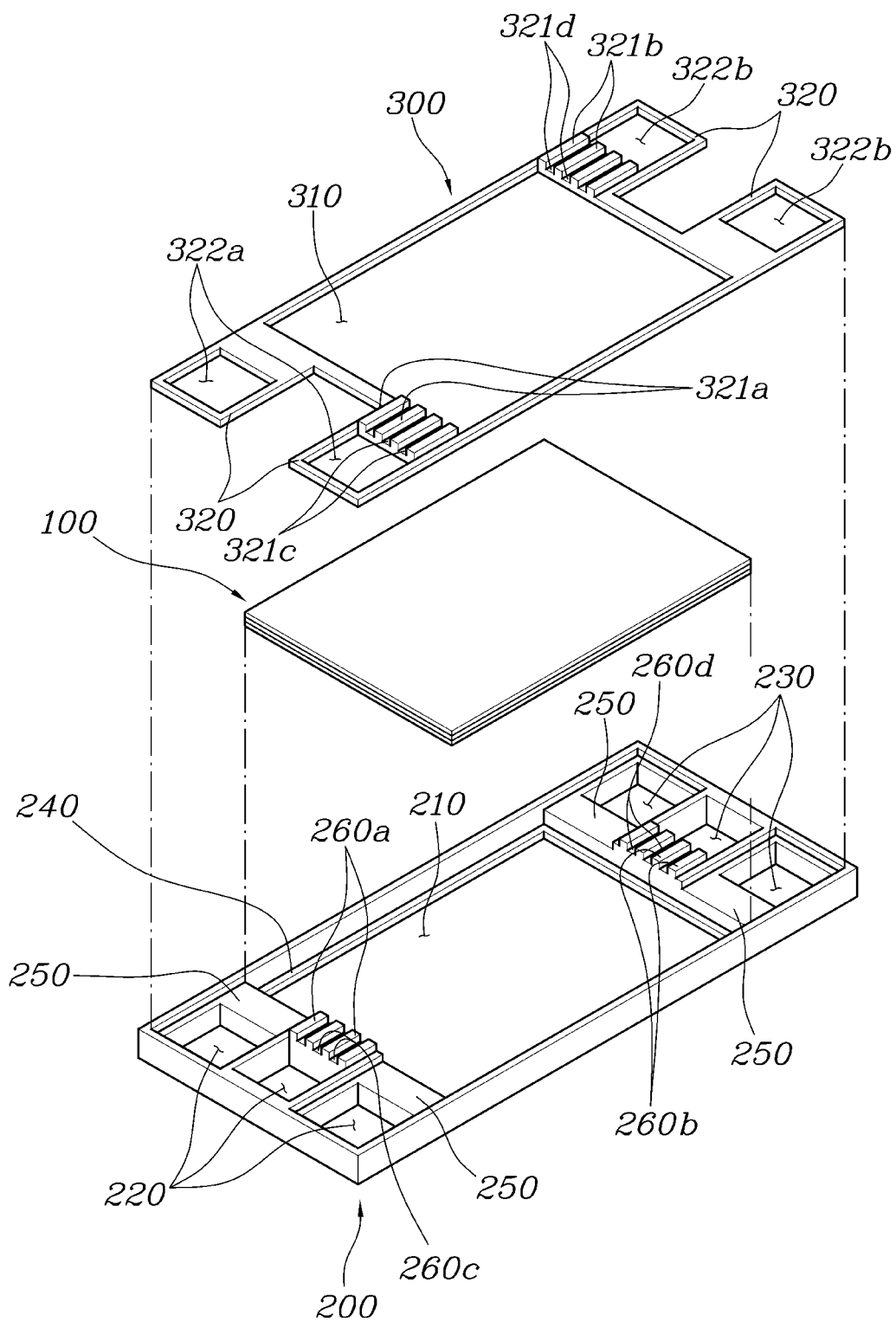
FIG. 4 and FIG. 5 are views of an elastomeric cell frame for a fuel cell according to various exemplary embodiments of the present invention.
Figure 5:
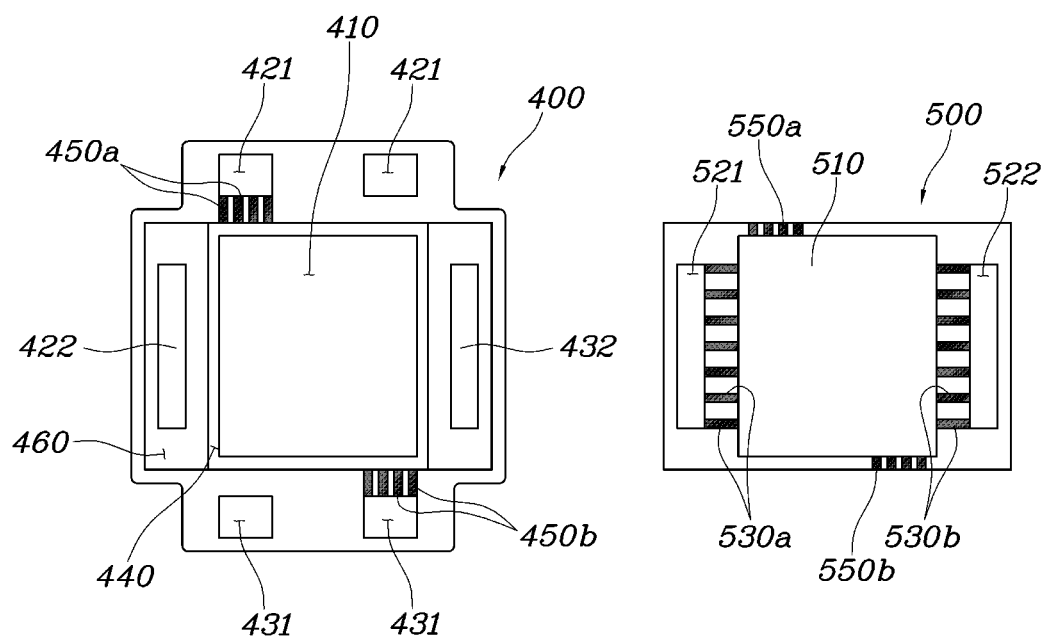

FIG. 4 and FIG. 5 are views of an elastomeric cell frame for a fuel cell according to various exemplary embodiments of the present invention.

First, as shown in FIG. 4, an elastomeric cell frame for a fuel cell according to various exemplary embodiments of the present invention, similar to the previous embodiment, includes an insert 100 and elastomeric frames 200 and 300. The insert 100 is the same as the insert 100 of the previous embodiment.

The elastomeric frames 200 and 300, similar to the previous embodiment, include a first elastomeric frame 200 and a second elastomeric frame 300. However, the positions and the number of the seating grooves 250 formed at the first elastomeric frame 200 and the positions and the number of extensions 320 formed at the second elastomeric frame 300 are changed.

For example, as shown in FIG. 4, the seating grooves 250 formed at the first elastomeric frame 200 may be formed outer first intake manifold through-holes 220 formed at both sides for the flow of reaction gas of three first intake manifold through-holes 220. A first intake land protrusion 260a forming a channel for the flow of reaction gas is formed in an area between the first reaction surface through-hole 210 and the first intake manifold through-hole 220 for the flow of reaction gas of the three first intake manifold through-holes 220 formed at the first elastomeric frame 200, and a first exhaust land protrusion 260b forming a channel for the flow of reaction gas is formed in an area between the first reaction surface through-hole 210 and the first exhaust manifold through-hole 230 for the flow of reaction gas of the three first exhaust manifold through-holes 230 formed at the first elastomeric frame 200.

A second reaction surface through-hole 310 in which the insert 100 is disposed and extensions 320 having shapes corresponding to the shapes of the seating grooves 250 formed at the first elastomeric frame 200 are formed at the second elastomeric frame 300 to face an internal surfaces of the stepped portions 240 and the seating grooves 250 formed at the first elastomeric frame 200, around the edge portion of the insert 100.

A second intake manifold through-hole 322a and second exhaust manifold through-hole 322b are formed at the extensions 320 of the second elastomeric frame 300 in shapes and at positions corresponding to the first intake manifold through-hole 220 and the first exhaust manifold through-hole 230 formed at the first elastomeric frame 200. Second intake land protrusions 321a forming channels for the flow of reaction gas are formed in an area between the second reaction surface through-hole 310 and the second intake manifold through-hole 322a of the extensions 320 of the second elastomeric frame 300, and second exhaust land protrusions 321b forming channels for the flow of reaction gas are formed in an area between the second reaction surface through-hole 310 and the second exhaust manifold through-hole 322b of the extensions 320 of the second elastomeric frame 300.

Next, as shown in FIG. 5, an elastomeric cell frame for a fuel cell according to various exemplary embodiments of the present invention, similar to the previous embodiments, includes an insert 100 and elastomeric frames 400 and 500. The insert is the same as the inserts 100 of the previous embodiments.

The elastomeric frames 400 and 500, similar to the previous embodiments, include a first elastomeric frame 400 and a second elastomeric frame 500. However, the positions of a plurality of intake manifold through-holes 421 and 422 and a plurality of exhaust manifold through-holes 431 and 432 formed at the elastomeric frames 400 and 500 are different, so that the positions and number of seating grooves 460 formed at the first elastomeric frame 400 and the shape of the second elastomeric frame 500 are different.

For example, as shown in FIG. 5, a first reaction surface through-hole 410 in which the insert 100 is disposed is formed at the first elastomeric frame 400 and stepped portions 440 surrounding the bottom portion and sides of the insert 100 are formed on the internal surface of the first reaction surface through-hole 410. Furthermore, in the figure, two first intake manifold through-holes 421 for the flow of reaction gas are formed at the upper portion of the first elastomeric frame 400, one first intake manifold through-hole 422 for the flow of coolant is formed at the left side, one first exhaust manifold through-hole 432 for the flow of coolant is formed at the right side, and two first exhaust manifold through-holes 431 for the flow of reaction gas are formed at the lower portion.

Furthermore, seating grooves 460 are formed at the first elastomeric frame 400 in areas corresponding to the outsides of the first intake manifold through-hole 422 for the flow of coolant and the first exhaust manifold through-hole 432 and the outside of the insert 100.

First intake land protrusions 450a forming channels for the flow of reaction gas are formed in an area between the first intake manifold through-holes 421 and the first reaction surface through-hole 410 for the flow of reaction gas in the first elastomeric frame 400. Furthermore, first exhaust land protrusions 450b forming channels for the flow of reaction gas are formed in an area between the first exhaust manifold through-holes 431 and the first reaction surface through-hole 410 in the first elastomeric frame 400. First intake extension land protrusions 550a and first exhaust extension land protrusions 550b that extend the portion between the areas where the first intake land protrusions 450a and the first exhaust land protrusions 450b are disposed and the insert 100 is disposed may be formed at the second elastomeric frame 500.

The second elastomeric frame 500 has a second reaction surface through-hole 510 which is formed in a shape corresponding to the stepped portions 440 and the seating groove 460 formed at the first elastomeric frame 400 and in which the insert 100 is disposed.

A second intake manifold through-hole 521 and a second exhaust manifold through-hole 522 are formed at the second elastomeric frame 500 in shapes and at positions corresponding to the first intake manifold through-hole 422 and the first exhaust manifold through-hole 432 formed at the first elastomeric frame 400. Furthermore, in the second elastomeric frame 500, second intake land protrusions 530a forming channels for the flow of coolant are formed in an area between the second intake manifold through-hole 521 and the second reaction surface through-hole 510, and second exhaust land protrusions 530b forming channels for the flow of coolant are disposed in an area between the second exhaust manifold through-hole 522 and the second reaction surface through-hole 510.

Meanwhile, according to an exemplary embodiment of the present invention, it is possible to improve interactive adhesive force by changing the shapes of the interfaces of a pair of sheet-type elastomeric frames forming the elastomeric frames.

Figure 6:
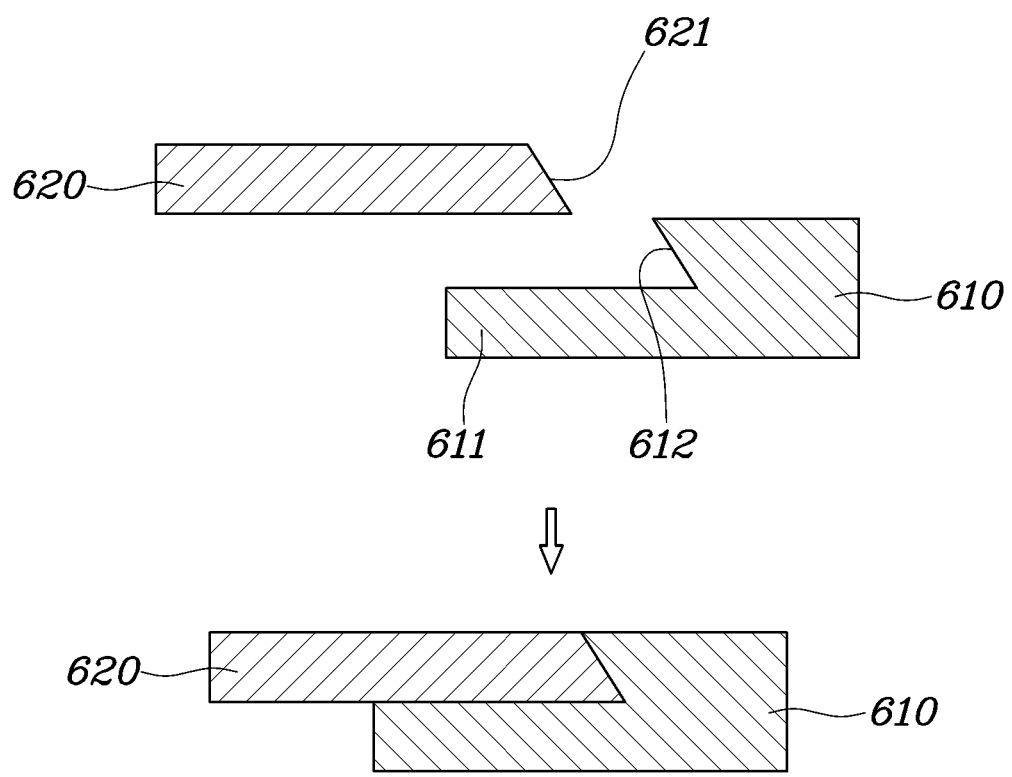
FIG. 6, FIG. 7, and FIG. 8 are main-part cross-sectional views showing the relationship between contact surfaces of a first elastomeric frame and a second elastomeric frame according to various embodiments of the present invention.
Figure 7:
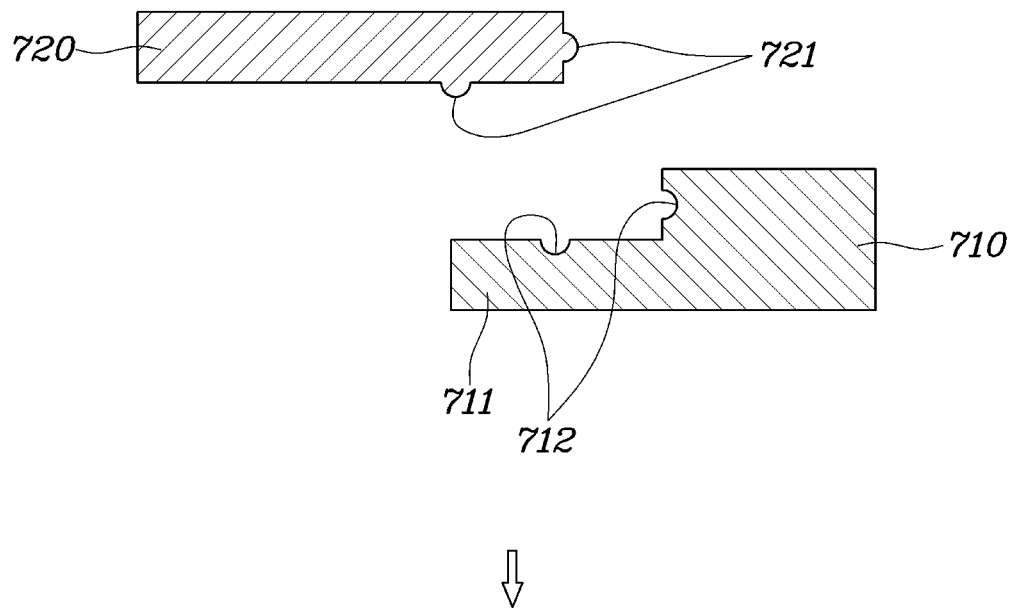
Figure 8:
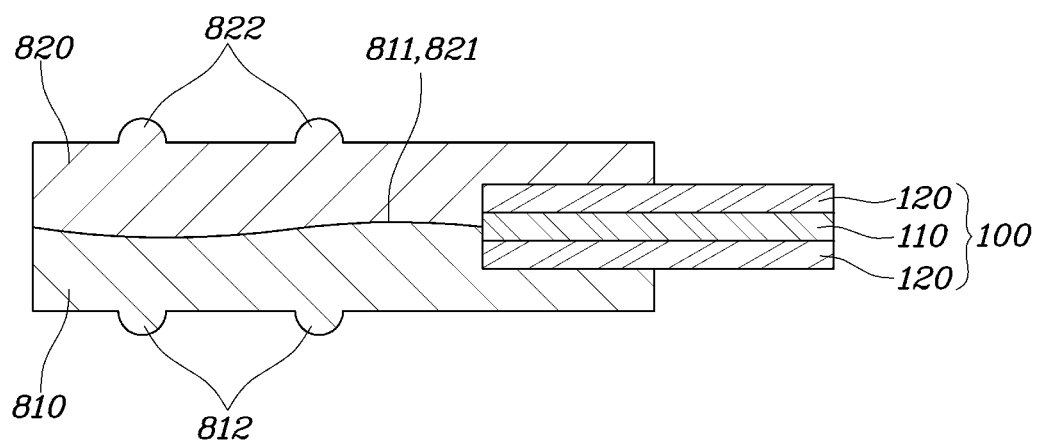

FIG. 6, FIG. 7, and FIG. 8 are main-part cross-sectional views showing the relationship between contact surfaces of a first elastomeric frame and a second elastomeric frame according to various embodiments of the present invention.

FIG. 6, FIG. 7, and FIG. 8 are cross-sectional views taken along line C-C of FIG. 1.

First, as shown in FIG. 6, a first elastomeric frame 610 and a second elastomeric frame 620 may have inclined surfaces 612 and 621 that have areas facing and corresponding to each other.

For example, a side of the second elastomeric frame 620 may be the inclined surface 621 and the internal surface where a stepped portion 611 is formed of the first elastomeric frame 610 may be the inclined surface 612 corresponding to the side inclined surface 621 of the second elastomeric frame 620. By forming the inclined surfaces 612 and 621 on the interface facing each other, the areas of the interfaces are increased and the interactive adhesive force may be improved.

Furthermore, as shown in FIG. 7, a first elastomeric frame 710 and a second elastomeric frame 720 may have prominence-depression structures that have areas facing and corresponding to each other.

For example, a plurality of adhesive protrusions 721 may be formed on a side and the bottom portion of the second elastomeric frame 720 and adhesive grooves 712 in which the adhesive protrusions 721 are fitted may be formed on the internal surface and a stepped portion 711 of the first elastomeric frame 710, at the positions where the adhesive protrusions 721 are formed. By the structure having the adhesive protrusions 721 and the adhesive grooves 712 formed on the interfaces, the areas of the interfaces are increased, so that the interactive adhesive force may be improved.

The cross-sections of the adhesive protrusions 721 and the adhesive grooves 712 may be formed in a semicircular shape, as shown in FIG. 7, but they are not limited thereto and may be formed in various shapes such as a rectangle, a triangle, and an ellipse.

Furthermore, as shown in FIG. 8, curved surfaces 811 and 821 may be formed respectively on the surfaces facing each other of a first elastomeric frame 810 and a second elastomeric frame 820, being able to increase the areas of the interfaces of the first elastomeric frame 810 and the second elastomeric frame 820.

Figure 9:
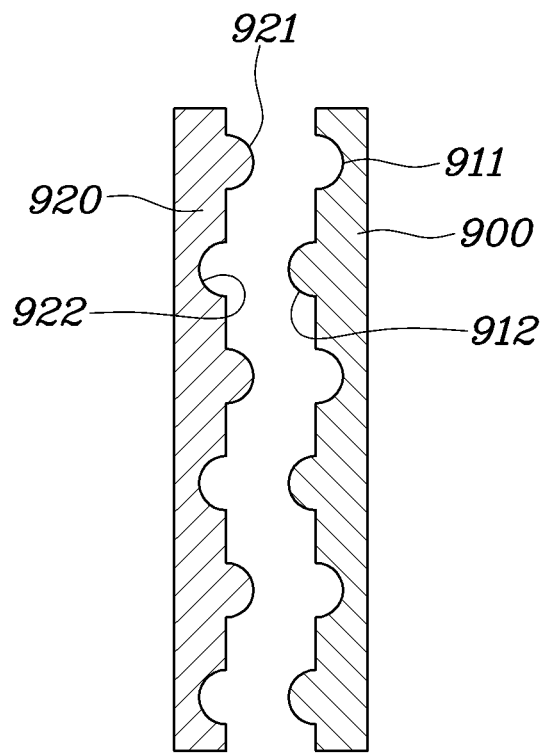
FIG. 9 is a plan view showing the relationship between contact surfaces of a first elastomeric frame and a second elastomeric frame according to various embodiments of the present invention.

FIG. 9 is a plan view showing the relationship between contact surfaces of a first elastomeric frame and a second elastomeric frame according to various embodiments of the present invention, particularly showing a plan view of the area taken along line C-C of FIG. 1.

As shown in FIG. 9, a first elastomeric frame 900 and a second elastomeric frame 920 may have prominence-depression structures that have areas facing and corresponding to each other.

For example, a plurality of adhesive protrusions 912 and 921 and a plurality of corresponding adhesive grooves 911 and 922 that are fitted to each other are formed on sides facing each other of a first elastomeric frame 910 and a second elastomeric frame 920. By the structure having the adhesive protrusions 912 and 921 and the adhesive grooves 911 and 922 formed on the interfaces, the areas of the interfaces are increased, so that the interactive adhesive force may be improved.

Similarly, the cross-sections of the adhesive protrusions 912 and 921 and the adhesive grooves 911 and 922 may be formed in a semicircular shape, as shown in FIG. 9, but they are not limited thereto and may be formed in various shapes such as a rectangle, a triangle, and an ellipse.

Meanwhile, as shown in FIG. 8, portions for hermetically bonding bipolar plates may be formed at the elastomeric frames.

For example, at least one or more first protrusive seals 812 surrounding the insert 100 may be formed outside the insert 100 on the bottom portion of a first elastomeric frame 810. Furthermore, at least one or more second protrusive seals 822 surrounding the insert 100 may be formed outside the insert 100 on the top portion of a second elastomeric frame 820.

A method of manufacturing the elastomeric cell frames for a fuel cell described above is described hereafter.

A method of manufacturing an elastomeric cell frame for a fuel cell according to an exemplary embodiment of the present invention includes: an insert preparation step of preparing an insert by bonding each of gas diffusion layers to both sides of a membrane electrode assembly disposed between the gas diffusion layers; an elastomeric frame preparation step of preparing a pair of sheet-type elastomeric frames each having intake land protrusions and exhaust land protrusions that form channels for the flow of reaction gas and coolant; an arrangement step of arranging the elastomeric frames with the insert therebetween; and a bonding step of integrating the elastomeric frames by thermally bonding the elastomeric frames by heating and pressing the elastomeric frames.

The insert preparation step is a step that prepare an insert by bonding a membrane electrode assembly and gas diffusion layers.

The membrane electrode assembly is a common membrane electrode assembly including a polymer electrolyte membrane and, a cathode and an anode on both respective sides of the polymer electrolyte membrane.

The gas diffusion layers may be each composed of a base material only or, a base material and a Micro-Porous Layer (MPL) formed on a side of the base material.

The insert is prepared by disposing the gas diffusion layers on both sides of the membrane electrode assembly.

The elastomeric frame preparation step is a step of preparing sheet-type elastomeric frames that are disposed on the top portion and the bottom portion of the insert.

The elastomeric frames are prepared by forming Thermoplastic Elastomer (TPE) in a sheet form. The elastomeric frames are prepared by forming TPE in a sheet form through injection molding.

In the arrangement step, the first elastomeric frame and the second elastomeric frame are disposed to overlap the edge portion of the insert. The bottom portion of the edge portion of the insert is accommodated on stepped portions of the first elastomeric frame and the area is covered by the second elastomeric frame.

The bonding step is a step of bonding the elastomeric frames to the insert by thermally bonding the elastomeric frames.

Here, the thermal bonding may be any one of hot-press bonding, ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

To the present end, the elastomeric frames and the insert are put in a hot-press mold. In the present process, the insert is disposed between the elastomeric frames.

A portion or the entirety of the area corresponding to the outside of the insert is heated and pressed by operating the hot-press mold, whereby the elastomeric frames are bonded and the elastomeric frames and the insert are bonded to each other.

Accordingly, the elastomeric frames and the insert are bonded at the interfaces by thermal bonding of the elastomeric frames, even without a specific adhesive member.

The temperature of the heat which is applied to the elastomeric frames is higher than the melting temperature of the elastomeric frames to securely bond the elastomeric frames and the insert.

The elastomeric cell frame for a fuel cell having the present configuration forms a unit cell for a fuel cell together with bipolar plates.

In detail, a unit cell for a fuel cell includes: an insert formed by bonding a pair of gas diffusion layers to both sides of a membrane electrode assembly disposed between the gas diffusion layers; an elastomeric cell frame formed by integrally thermally bonding a pair of sheet-type elastomeric frames to the bottom and the top portion of the edge portion of the insert outside the insert; and a pair of bipolar plates disposed on both sides of the elastomeric cell frame to guide reaction gas and coolant.

The elastomeric cell frame may be elastomeric cell frames that are achieved in various ways in accordance with the embodiments.

The elastomeric cell frame and the bipolar plate may be bonded by thermally bonding the elastomeric cell frame, with the elastomeric cell frame and the bipolar plates stacked to face each other. In the present process, the elastomeric cell frames and the bipolar plates may be stacked without thermal bonding therebetween.

In particular, in the unit cell for a fuel cell according to an exemplary embodiment of the present invention, intake land protrusions and exhaust land protrusions are in contact with bipolar plates, forming channels for the flow of reaction gas and coolant.

The shapes of the intake land protrusions and the exhaust land protrusions and the shape of the bipolar plates for forming channels may be changed in various ways.

FIG. 10, FIG. 11, and FIG. 12, and FIG. 13 are main-part cross-sectional views showing a connection relationship between a bipolar plate and an elastic cell frame according to various embodiments of the present invention.

Intake land protrusions and exhaust land protrusions may be formed in the same shape, so intake land protrusions are exemplified in the following description.

Figure 10:
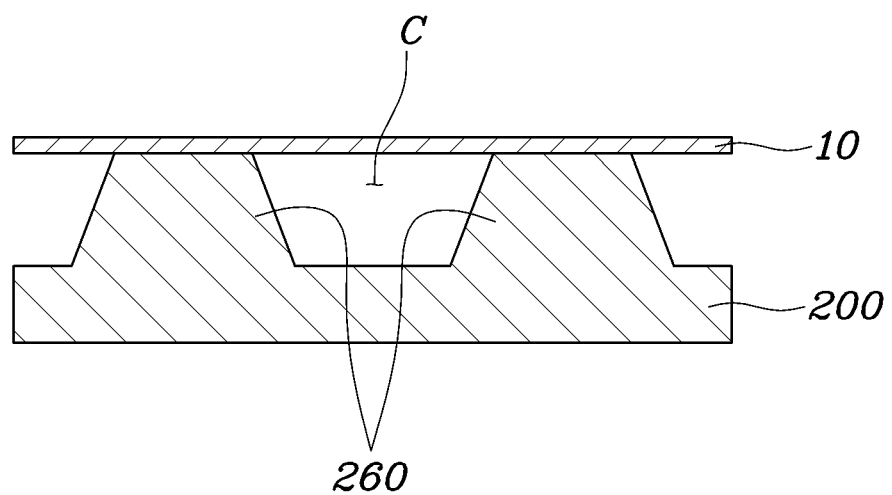
FIG. 10, FIG. 11, and FIG. 12, and FIG. 13 are main-part cross-sectional views showing a connection relationship between a bipolar plate and an elastomeric cell frame according to various embodiments of the present invention.
Figure 11:
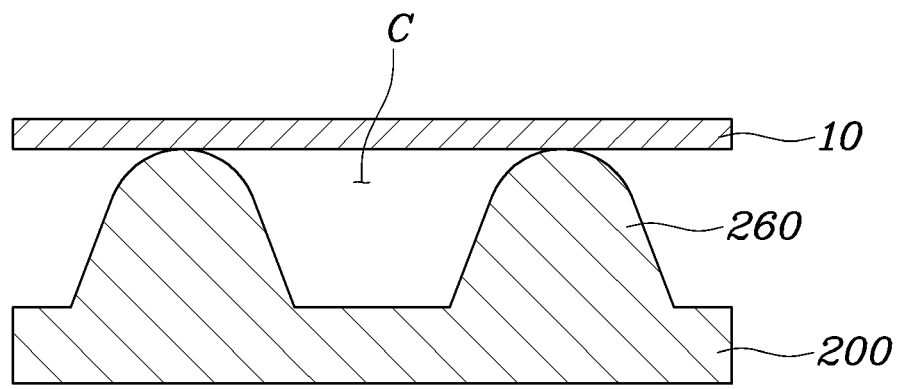

As shown in FIG. 10, and FIG. 11, intake land protrusions 260 protrude from the first elastomeric frame 200 toward the bipolar plate 10 such that the cross-sectional width gradually decreases in the protrusion direction thereof. The shapes of the intake land protrusions 260 may be changed in various ways. The reason for gradually decreasing the cross-sectional width of the intake land protrusions 260 is to prevent channels C from being blocked by deformation due to compression of the first elastomeric frame 200 when the first elastomeric frame 200 and the bipolar plate 10 are pressed to stack and bond the first elastomeric frame 200 and the bipolar plate 10.

Figure 12:
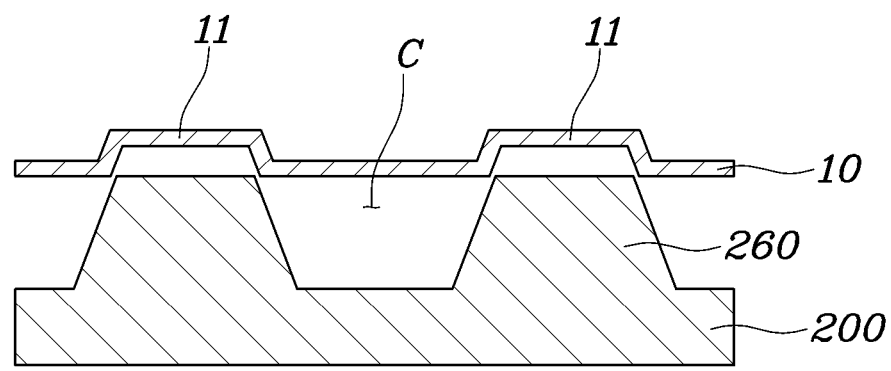
Figure 13:
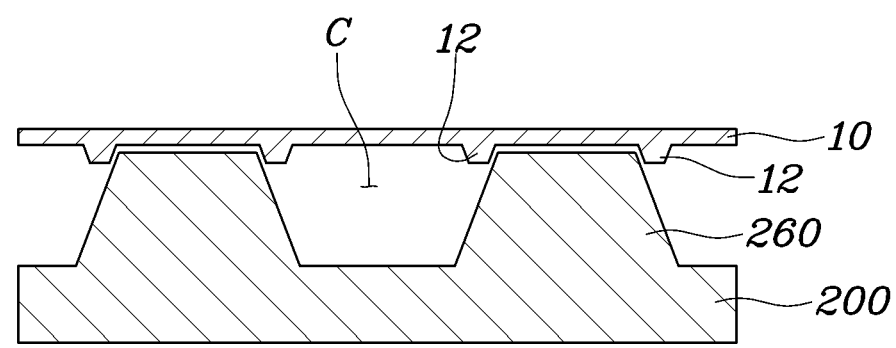

Furthermore, as shown in FIG. 12, and FIG. 13, the shape of the bipolar plate may be changed to maintain the shape of the intake land protrusions and prevent a change in their positions when a first elastomeric frame and a bipolar plate are pressed.

For example, as shown in FIG. 12, recessions 11 corresponding to the shapes of end portions of the intake land protrusions 260 may be formed on the bipolar plate 10 in the areas being in contact with the intake land protrusions 260.

Furthermore, as shown in FIG. 13, guide protrusions 12 surrounding the areas being in contact with the intake land protrusions 260 may be formed on the bipolar plate 10.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An elastomeric cell frame for a fuel cell, the elastomeric cell frame comprising:
    an insert formed of a pair of gas diffusion layers each bonded to a first side and a second side of a membrane electrode assembly disposed between the gas diffusion layers; and
    an elastomeric frame including:
        a pair of elastomeric frames disposed on a bottom portion and a top portion of an edge portion of the insert;
        a reaction surface through-hole formed in each of the pair of sheet-type elastomeric frames, wherein the insert is inserted into the reaction surface through-hole;
        at least an intake manifold through-hole formed at a first side of each of the pair of elastomeric frames outside the reaction surface through-hole of the pair of elastomeric frames and configured for receiving reaction gas or coolant therethrough;
        at least an exhaust manifold through-hole formed at a second side of each of the pair of elastomeric frames and configured for discharging the reaction gas or the coolant therethrough;
        intake land protrusions including at least a first channel for a flow of the reaction gas and the coolant and formed in a first area between the reaction surface through-hole and at least one of the intake manifold through-holes; and
        exhaust land protrusions including at least a second channel for a flow of the reaction gas and the coolant and formed in a second area between the reaction surface through-hole and at least one of the exhaust manifold through-holes,
        wherein the pair of elastomeric frames is integrated to each other by thermal bonding directly outside the insert.

2. The elastomeric cell frame of claim 1, wherein the thermal bonding is any one of hot-press bonding, ultrasonic bonding, high frequency bonding, vibration bonding, infrared bonding, radiant-heat bonding, calender bonding and laser bonding.

3. The elastomeric cell frame of claim 1, wherein the pair of elastomeric frames includes:
    a first elastomeric frame which is disposed outside the insert and surrounding the bottom portion and sides of the edge portion of the insert,
        wherein the first elastomeric frame includes:
            stepped portions formed in an internal surface of the reaction surface through-hole and surrounding the bottom portion and the sides of the insert; and
            seating grooves formed outside the at least an intake manifold through-hole and outside the at least an exhaust manifold through-hole and communicating with the stepped portions, and
    a second elastomeric frame disposed to surround the top portion of the edge portion of the insert,
        wherein the second elastomeric frame includes:
            extensions formed in a shape corresponding to the seating grooves to face the seating grooves and an internal surface of the stepped portions of the first elastomeric frame around the edge portion of the insert.

4. The elastomeric cell frame of claim 3, wherein the extensions of the second elastomeric frame are accommodated into the seating grooves of the first elastomeric frame.

5. The elastomeric cell frame of claim 3, further including:
    a first bonding portion, in which the stepped portions of the first elastomeric frame and the bottom portion of the insert are thermally bonded to face each other;
    a second bonding portion, in which the second elastomeric frame, the top portion of the insert, and the seating grooves are thermally bonded to face one another; and
    a third bonding portion formed between the insert and the first and second elastomeric frames, wherein the stepped portions of the first elastomeric frame and the sides of the insert are thermally bonded to face each other.

6. The elastomeric cell frame of claim 3,
    wherein the first elastomeric frame and the second elastomeric frame have inclined surfaces that have areas facing and corresponding to each other.

7. The elastomeric cell frame of claim 3,
    wherein the first elastomeric frame and the second elastomeric frame have prominence-depression structures that have areas facing and corresponding to each other.

8. The elastomeric cell frame of claim 1,
    wherein the pair of elastomeric frames is made of thermoplastic elastomer.

9. The elastomeric cell frame of claim 1, wherein the intake land protrusions and the exhaust land protrusions are decreased in width in a protrusion direction thereof.

10. A method of manufacturing an elastomeric cell frame for a fuel cell, the elastomeric cell frame forming a unit cell of a fuel cell stack, the method including:
    an insert preparation step of preparing an insert by bonding each of gas diffusion layers to a first side and a second side of a membrane electrode assembly;
    an elastomeric frame preparation step of preparing a pair of elastomeric frames each having intake land protrusions and exhaust land protrusions that form channels for a flow of reaction gas and coolant;
    an arrangement step of arranging the pair of elastomeric frames with the insert therebetween; and
    a bonding step of integrating the pair of elastomeric frames by thermally bonding the pair of elastomeric frames to each other by directly heating and pressing the pair of elastomeric frames.

11. The method of claim 10, wherein the elastomeric frames are prepared by forming thermoplastic elastomer in a sheet-type in the elastomeric frame preparation step.

12. The method of claim 10, wherein the pair of elastomeric frames is bonded by heating and pressing a portion or an entirety of areas facing each other of the pair of elastomeric frames with the insert disposed between the pair of elastomeric frames in the bonding step.

13. The method of claim 10, wherein the heat which is applied to the pair of elastomeric frames in the bonding step is higher than a melting temperature of the pair of elastomeric frames.

14. The method of claim 10, wherein the pair of elastomeric frames is thermally bonded to each other without an adhesive member in the bonding step.

15. A unit cell for a fuel cell, the unit cell comprising:
    an insert formed of a pair of gas diffusion layers each bonded to a first side and a second side of a membrane electrode assembly disposed between the gas diffusion layers;
    an elastomeric cell frame including:
      a pair of elastomeric frames disposed on a bottom portion and a top portion of an edge portion of the insert;
      a reaction surface through-hole formed in each of the pair of elastomeric frames,
      wherein the insert is inserted into the reaction surface through-hole;
      at least an intake manifold through-hole formed at a first side of each of the pair of elastomeric frames outside the reaction surface through-hole of the pair of elastomeric frames and configured for receiving reaction gas and coolant therethrough;
      at least an exhaust manifold through-hole formed at a second side of each of the pair of elastomeric frames and configured for discharging the reaction gas and the coolant therethrough;
      intake land protrusions including at least a first channel for a flow of the reaction gas and the coolant and formed in a first area between the reaction surface through-hole and at least one of the intake manifold through-holes; and
      exhaust land protrusions including at least a second channel for a flow of the reaction gas and the coolant and formed in a second area between the reaction surface through-hole and at least one of the exhaust manifold through-holes; and
    a pair of bipolar plates disposed on a first side and a second side of the elastomeric cell frame to guide the reaction gas and the coolant,
    wherein the pair of elastomeric frames is integrated to each other by thermal bonding directly outside the insert.

16. The unit cell of claim 15, wherein a third channel for the flow of the reaction gas and the coolant are formed by contact of the intake and exhaust land protrusions and the plurality of bipolar plates.

17. The unit cell of claim 16, wherein recessions corresponding to shapes of end portions of the intake land protrusions and the exhaust land protrusions are formed on the plurality of bipolar plates in areas being in contact with the intake land protrusions and the exhaust land protrusions of the elastomeric cell frame.

18. The unit cell of claim 17, wherein guide protrusions surrounding the areas being in contact with the intake land protrusions and the exhaust land protrusions of the elastomeric cell frame are formed on the plurality of bipolar plates.

* * * * *